Patented Feb. 5, 1952

2,584,316

UNITED STATES PATENT OFFICE 2,584,316

COPOLYMERS OF DIALLYL ENDOMETHYL-ENE TETRAHYDROPHTHALATE AND AN UNSATURATED MIXED POLYESTER

Robert J. Agnew, Pawling, N. Y., assignor to The Texas Company, New York, N. Y., a corporation of Delaware No Drawing. Application December 29, 1948, Serial No. 68,082

1 Claim. (Cl. 260—45.4)

This invention relates to copolymers of diallyl endomethylene tetrahydrophthalate and an unsaturated polyester. Copolymers which form the subject of this invention are characterized by chemical inertness and thermal stability. The possession of these properties marks the copolymers of this invention as components of excellent coating compositions.

This application is a continuation-in-part of my copending application Serial No. 28,279, filed May 20, 1948, wherein there is disclosed novel copolymers which are characterized by chemical inertness and thermal stability and which are formed by the copolymerization of a diallyl ester of phthalic, tetrahydrophthalic, chlorotetrahydrophthalic acid or mixtures thereof, with an unsaturated mixed polyester in which a dihydroxy alkane or alkene is esterified with two dibasic acids. In this invention it has been discovered that chemically inert and thermally stable copolymers also result from the reaction of diallyl endomethylene tetrahydrophthalate and an unsaturated polyester.

Copolymers of this invention are formed by reaction of diallyl endomethylene tetrahydrophthalate or a mixture thereof with the diallyl esters of phthalic, tetrahydrophthalic and chlorotetrahydrophthalic acids with an unsaturated mixed polyester in which a dihydroxy alkane or alkene containing two or more carbon atoms is esterified with two dibasic acids. One of the two dibasic acids used in the preparation of the polyester is an aromatic dibasic acid, while the other dibasic acid is an alpha-olefinic unsaturated dibasic acid which constitutes at least 10 per cent of the total dibasic acid content of the mixed polyester. Phthalic acid and derivatives thereof are preferred aromatic acids for the preparation of mixed polyesters; maleic, fumaric and itaconic are preferred alpha-olefinic unsaturated acids for the preparation of mixed polyesters.

The copolymer comprises 5 to 45 weight per cent diallyl endomethylene tetrahydrophthalate and 55 to 95 weight per cent of unsaturated polyester. Ordinarily, the copolymer is formed by reacting 20 to 35 weight per cent diallyl endomethylene tetrahydrophthalate with 65 to 80 weight per cent unsaturated polyester. When the components of the copolymer are reacted within this latter prescribed weight ratio, the resulting copolymer is particularly characterized by inertness to alkalis. acids, solvents and by high thermal stability.

The polyester component of the copolymer is prepared by condensing a dihydroxy alkane or alkene such as ethylene glycol, propylene glycol, vinylethylene glycol with a mixture of two dibasic acids or their anhydrides. Hereafter, whenever it is stated that a dibasic acid is employed, it will be understood that its anhydride may be substituted therefor without any change whatsoever in the properties of the resulting polyester. One of the dibasic acids employed for the preparation of the mixed polyester is an aromatic dibasic acid such as phthalic, terephthalic and tetrachlorophthalic acid; the other dibasic acid is an alpha-olefinic unsaturated dibasic acid such as maleic, fumaric and itaconic acids. The alpha-olefinic unsaturated dibasic acids which constitute at least 10 per cent of the total dibasic acid content of the unsaturated polyester have the generic formula

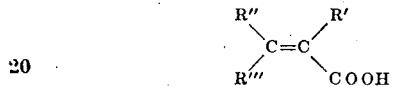

wherein R', R" and R''' are either hydrogen atoms, alkyl groups, cyclo-alkyl groups, carboxyl groups or their substitution products, at least one of the R', R", R''' groups being a carboxylic acid group or a carboxylic acid-substituted group.

Ordinarily, the alpha-olefinic unsaturated dibasic acid and the aromatic dibasic acid are employed in equimolecular quantities for the preparation of the mixed polyester. However, the alpha-olefinic unsaturated dibasic acid must comprise at least 10 per cent and not more than 80 per cent of the total dibasic acid content of the mixed polyester. The properties of the copolymer resulting from the interpolymerization of diallyl endomethylene tetrahydrophthalate and the unsaturated polyester are affected by the amount of alpha-olefinic unsaturated dibasic acid employed in the preparation of the mixed polyester. The best results from the viewpoint of manipulation and physical properties are obtained when approximately an equimolecular ratio of aromatic dibasic acid and alpha-olefinic unsaturated dibasic acid is employed for the preparation of the polyester.

The dihydroxy alkane or alkene containing at least 2 carbon atoms employed in the preparation of the unsaturated polyester advantageously contains two primary alcohol groups because esterification is effected more readily therewith. Ethylene glycol, 1,4-butanediol and 1,6-hexanediol are examples of the preferred type glycol containing two primary alcohol groups. However, other glycols such as propylene glycol, 1,2-butylene glycol, 1,2-hexanediol may also be used in the process of this invention. It is preferred to use dihydroxy alkanes in the preparation of the polyesters.

The mixed polyesters are prepared by reacting a dihydroxy alkane or alkene such as ethylene glycol with a mixture comprising an aromatic dibasic acid and an alpha-olefinic unsaturated dibasic acid at temperatures of 150–225° C. The polyesterification is advantageously effected in the presence of an inert gas in order to prevent cross-linking between the polyester molecules by the formation of oxygen linkages between the activated double bonds of the unsaturated dibasic acid. Oxygen may be excluded either by passing the inert gas over the surface of the reactants or by bubbling the gas through the liquid reactants. Bubbling of the inert gas through the liquid reactants has the advantages of agitating the mixture and also carrying away at least part of the water formed during the reaction. The esterification reaction is continued until the polyester contains 5 to 12 condensation units per molecule.

It is generally preferable to employ a slight excess, for example, 0.05 to 0.1 mol excess of glycol in order to hasten the condensation reaction. Moreover, it is also possible to employ an inert solvent such as toluene for the preparation of the mixed polyester. When a solvent is employed, the reactants are heated in a solvent mixture under reflux and the water split out during the esterification is separated from the condensed solvent prior to the return of the solvent to the reaction zone. After esterification is complete the solvent is stripped from the polyester in vacuum. An inert gas is also used to prevent oxygen cross-linkage when a solvent is employed during the polyesterification reaction.

Diallyl endomethylene tetrahydrophthalate is prepared by esterification with allyl alcohol of the anhydride prepared by a Diels-Alder reaction between cyclopentadiene and maleic anhydride. The procedures employed for the esterification reaction and for the Diels-Alder reaction are conventional and are well known in the art.

Copolymerization of diallyl endomethylene tetrahydrophthalate or mixtures thereof with a mixed polyester prepared as heretofore described is effected in the presence of a peroxide catalyst and at a temperature of 50–110° C. The catalyzed mixture is poured into a suitable mold and subjected to temperatures of 50–110° C. until the copolymerization is substantially complete which ordinarily requires from 2 to 7 days. The duration of the copolymerization reaction depends upon the components of the polyester, the specimen thickness, the catalyst concentration and other operational factors.

Copolymerization will take place slowly in the absence of a catalyst but it is preferred to employ an organic peroxide catalyst. Acid peroxides such as acetyl peroxide, benzoyl peroxide, phthalic peroxide and succinic peroxide are preferred for the copolymerization reaction. Other peroxides such as tertiary butyl hydro-peroxide, may also be used to catalyze the copolymerization reaction. In a preferred procedure for the copolymerization of diallyl endomethylene tetrahydrophthalate and a mixed polyester, 0.25 to 5.0 per cent by weight of acetyl or benzoyl peroxide is employed. The peroxides may be dissolved with the diallyl endomethylene tetrahydrophthalate prior to its mixing with the mixed polyester, or the catalyst may be added to a mixture of diallyl ester and the unsaturated polyester.

It is possible to vary the physical and chemical properties of the copolymers resulting from the reaction between diallyl endomethylene tetrahydrophthalate and the mixed polyester by changing the composition and degree of condensation of the mixed polyester, by altering the ratio of mixed polyester to diallyl ester and by modifying the copolymerization conditions. By altering the aforementioned variables, the character of the copolymers can be varied to some extent but all copolymers of the type described herein are hard, tough and resistant to chemicals.

The following example will illustrate the procedures employed for the preparation of the novel copolymers of this invention:

273 grams of ethylene glycol, 196 grams of maleic anhydride and 296 grams of phthalic anhydride were reacted at a temperature of about 175–190° C. The reaction mixture contained equimolar quantities of maleic anhydride and phthalic anhydride with a slight molar excess of glycol. The mixture was continuously agitated and the reaction was effected in an atmosphere of carbon dioxide in order to minimize oxygen cross-linking. After a period of about 3 to 3.5 hours, a clear water-white mixed polyester was produced having an acid number of 48.0 and containing about 6.8 condensation units per molecule.

350 grams of this polyester and 150 grams of diallyl endomethylene tetrahydrophthalate were thoroughly mixed with 5.0 grams of acetyl peroxide; the mixture was poured into a suitable mold and heated at 66° C. for 24 hours at 80° C. for 76 hours, thus making an overall curing time of 100 hours. As a result of this treatment, there was obtained a light yellow, hard copolymer comprising 70 weight per cent of mixed polyester and 30 weight per cent of diallyl endomethylene tetrahydrophthalate. The copolymer was very resistant to chemicals only suffering a 2.4 per cent of loss in weight on immersion in 1 per cent sodium hydroxide for 7 days.

The properties of the copolymer prepared as described in the foregoing example are summarized in Table I.

*Table I*

| | |
|---|---|
| Rockwell hardness | M–112 |
| Flammability, in./min. | 0.64 |
| Flex. strength, p. s. i. | 10,500 |
| Compression strength, p. s. i. | 18,500 |
| Impact strength, ft. lb./in. | 0.23 |
| Resistance to chemicals, percent of change in weight after 7 days' immersion: | |
| 10% NaOH | 30.0 |
| 1% NaOH | 2.4 |
| 95% $C_2H_5OH$ | 0.8 |
| 50% $C_2H_5OH$ | 1.2 |
| Acetone | 0.9 |

The chemical inertness of the copolymers of this invention is well illustrated in Table I. The alcohol and acetone insolubility is an outstanding property of the copolymers of this invention.

Natural or synthetic resins can be mixed with the copolymers of this invention in order to modify the properties thereof and to give products which are adapted for particular purposes. Alkyd resins, urea resins, phenolic resins, ether and ester derivatives of cellulose all can be admixed with the copolymers of this invention; moreover, natural and synthetic rubber type products may be also used to modify the properties of the copolymers of this invention.

An advantage of the copolymers of this invention resides in the fact that the curing time is short. Ordinarily a period between 48 and 168 hours is sufficient for the curing time of the copolymers by casting technique. The short curing time is of particular advantage when large blocks of copolymer are being cured.

An important advantage resides in the fact that no solvent is required for the curing of the copolymers of the present invention. Consequently, there are no shrinkage problems resulting from the employment of solvents if the copolymers are used as coating compositions. Since there is no solvent to be removed and since air is not needed to cure the copolymer, relatively thick layers may be applied in one operation when the copolymers are employed as coating compositions.

The copolymerization is effected either with the aid of heat, ultra-violet light, catalyst or combinations thereof; ordinarily a combination of heat and catalyst are employed to effect the copolymerization. The temperature during the copolymerization should be maintained between room temperature and 150° C. It is advisable to initiate the copolymerization by maintaining the temperature in the lower part of this range, namely from 50 to 60° C. for an induction period; thereafter, the temperature can be raised to complete the copolymerization.

It is also practicable to mix fillers with the diallyl endomethylene tetrahydrophthalate and unsaturated polyester prior to copolymerization. Wood flour, wood fiber, paper dust, clay, zein, glass wool, carborundum, paper cloth, sand, granite dust, steel wool are examples of fillers that may be employed. The use of a filler does not materially alter the mode of copolymerization of the diallyl ester and the unsaturated mixed polyester.

Obviously many modifications and variations of the invention, as hereinbefore set forth, may be made without departing from the spirit and scope thereof and, therefore, only such limitations should be imposed as are indicated in the appended claim.

I claim:

A copolymer formed by the copolymerization of 30 weight per cent diallyl endomethylene tetrahydrophthalate and 70 weight per cent of an unsaturated polyester formed by esterification of ethylene glycol with an equimolecular mixture of maleic anhydride and phthalic anhydride.

ROBERT J. AGNEW.

REFERENCES CITED

The following references are of record in the file of this patent:

UNITED STATES PATENTS

| Number | Name | Date |
| --- | --- | --- |
| 2,409,633 | Kropa | Oct. 22, 1946 |